(12) United States Patent
Li et al.

(10) Patent No.: US 11,509,472 B2
(45) Date of Patent: Nov. 22, 2022

(54) METHOD FOR SHARING MODELS AMONG AUTONOMOUS VEHICLES BASED ON BLOCKCHAIN

(71) Applicant: XIDIAN UNIVERSITY, Shaanxi (CN)

(72) Inventors: Changle Li, Shaanxi (CN); Fan Li, Shaanxi (CN); Yuchuan Fu, Shaanxi (CN); Pincan Zhao, Shaanxi (CN)

(73) Assignee: XIDIAN UNIVERSITY, Shaanxi (CN)

( * ) Notice: Subject to any disclaimer, the term of this patent is extended or adjusted under 35 U.S.C. 154(b) by 28 days.

(21) Appl. No.: 17/155,057

(22) Filed: Jan. 21, 2021

(65) Prior Publication Data

US 2021/0226790 A1 Jul. 22, 2021

(30) Foreign Application Priority Data

Jan. 22, 2020 (CN) .......................... 202010074874.7

(51) Int. Cl.
*H04L 9/30* (2006.01)
*H04W 4/44* (2018.01)
*G06N 3/08* (2006.01)
*H04L 9/08* (2006.01)

(52) U.S. Cl.
CPC ............. *H04L 9/3066* (2013.01); *G06N 3/08* (2013.01); *H04L 9/0869* (2013.01); *H04W 4/44* (2018.02); *H04L 2209/80* (2013.01); *H04L 2209/84* (2013.01)

(58) Field of Classification Search
CPC . H04L 9/3066; H04L 9/0869; H04L 2209/80; H04L 2209/84; H04L 9/50; H04L 9/3297; H04L 9/3239; H04L 9/0643; H04L 9/0861; H04L 67/12; H04L 9/30; H04L 9/08; G06N 3/08; G06N 3/0454; H04W 4/44

See application file for complete search history.

(56) References Cited

U.S. PATENT DOCUMENTS

| | | | |
|---|---|---|---|
| 2019/0012595 A1 | 1/2019 | Beser et al. | |
| 2021/0233192 A1* | 7/2021 | Manamohan | ........ G06Q 20/388 |
| 2021/0345072 A1* | 11/2021 | Selvanesan | ............. H04W 4/08 |

FOREIGN PATENT DOCUMENTS

| | | |
|---|---|---|
| CN | 107145387 A | 9/2017 |
| CN | 110155079 A | 8/2019 |

OTHER PUBLICATIONS

Anonymous. "EOS.IO Technical White Paper v2", block.one, Mar. 16, 2018 (25 pages).

(Continued)

*Primary Examiner* — Quazi Farooqui
(74) *Attorney, Agent, or Firm* — Womble Bond Dickinson (US) LLP; Joseph Bach, Esq.

(57) ABSTRACT

The present disclosure discloses a method for sharing models among autonomous vehicles based on a blockchain, the method comprising the steps of: 1) creating a mobile edge computing network; 2) generating a key pair for each node in the mobile edge computing network; 3) creating a local model set of a mobile node set in the mobile node computing network; 4) enabling each mobile node to communicate with a corresponding nearest mobile edge computing node; 5) creating supernode sequences by the mobile edge computing node; 6) creating a blockchain based on the supernode sequences; and 7) updating the local model set.

4 Claims, 2 Drawing Sheets

(56) References Cited

OTHER PUBLICATIONS

Australian Examination Report No. 1 dated Jan. 18, 2022 from Australian Application No. 2021200302 (5 pages).
Ikram, A. et al. "A blockchain-based certificateless public key signature scheme for vehicle-to-infrastructure communication in VANETs", Journal of Systems Architecture, vol. 99, Aug. 21, 2019, 101636 (17 pages).
Zhang, D. et al. "Blockchain-Based Distributed Software-Defined Vehicular Networks: A Dueling Deep Q—Learning Approach" in IEEE Transactions on Cognitive Communications and Networking, vol. 5, No. 4, Dec. 2019 (pp. 1086-1100).

* cited by examiner

METHOD FOR SHARING MODELS AMONG AUTONOMOUS VEHICLES BASED ON BLOCKCHAIN

CROSS-REFERENCE TO RELATED APPLICATIONS

This application claims the benefit of Chinese Patent Application No. 202010074874.7, filed on Jan. 22, 2020, which is hereby incorporated by reference in its entirety.

TECHNICAL FIELD

The present disclosure relates to the field of autonomous driving (self-driving) technique, and in particular to a method for sharing models among autonomous vehicles based on a blockchain, so as to realize a safer and more reliable autonomous driving process.

BACKGROUND

When an autonomous vehicle is going to come across an obstacle during an autonomous driving process, a decision to decelerate, accelerate, and/or turn has to be made by the autonomous vehicle. A typical method for making the decision is based on a learning model which is to be trained during a decision process. An accuracy of the model and an efficiency of the model training are key factors that contribute to an accuracy of the decision and an efficiency of the decision process.

Currently, methods for the model training can be categorized into a model training method based on a single autonomous vehicle itself and a model training method based on a cloud-based service. In the model training method based on the single autonomous vehicle, data acquiring and the model training are performed by the autonomous vehicle independently. It is difficult to guarantee the accuracy of the decision made for autonomous driving in this method, since the number of sensors installed in the single autonomous vehicle and the number of driving scenarios for the single autonomous vehicle are limited. Further, the efficiency of the decision process is low due to a limited computing capacity of the single autonomous vehicle.

In the model training method based on a cloud-based service, data acquired by the sensors installed in the autonomous vehicle is uploaded to a cloud-based service center in which the model training is preformed, and then an updated model is downloaded from the cloud-based service center to the autonomous vehicle. It is the method that is widely used for the model training of the autonomous vehicle currently, since the problem brought by the limited number of the sensors installed in the single autonomous vehicle and the limited number of the driving scenarios for the single autonomous vehicle is resolved.

For example, a model training method based on a cloud-based service is disclosed in Patent Pub. No. CN 110196593 A, titled "System and Method for Detecting Multiple Scenarios and Making Decisions for Autonomous Driving", in which data acquired by an autonomous vehicle from on-board core sensors is compressed, stored, and uploaded regularly to a cloud-based service center, and a model is trained from machine learning in the cloud-based service center. Although the accuracy of the decision and the efficiency of the decision process accomplished by the model as disclosed are relatively high when the model is applied for the decision process of the autonomous vehicle, it has some drawbacks.

1. As the model can only be trained in the cloud-based service center, once a server of the cloud-based service center fails, it would be impossible to perform the model training and download the updated model from the cloud-based service center to be used for making the decision for the autonomous vehicle.

2. It is hard to know whether the data is falsified by malicious nodes during a model training process in the cloud-based service center. Thus, if the data is falsified, the model trained in the cloud-based service center is inaccurate, and the accuracy of the decision made by the updated model downloaded from the cloud-based service center to the autonomous vehicle becomes low as well.

3. An identity of the autonomous vehicle is not verified by the cloud-based service center as the data is uploaded from the autonomous vehicle to the cloud-based service center. Thus, if any falsified data is uploaded from a malicious node, the falsified data would be used to train the model by the cloud-based service center, and the accuracy of the decision made by the updated model downloaded from the cloud-based service center to the autonomous vehicle becomes low as well.

4. It is necessary to upload mass of data from the autonomous vehicle to the cloud-based service center, causing a great burden to a communication network, which has to slow down the speed of data uploading. Thus, an efficiency of the model training is relatively low, and the efficiency of the decision process becomes low as well.

SUMMARY

An objective of the present disclosure is to overcome the above-mentioned drawbacks in the prior art by providing a method for sharing models among autonomous vehicles based on a blockchain, so as to improve an accuracy of a decision made by an autonomous vehicle and an efficiency of a decision process.

In order to achieve the above objective, an embodiment of the present disclosure provides the method for sharing models among autonomous vehicles based on the blockchain comprising the steps of:

(1) creating a mobile edge computing network by:
provisioning autonomous vehicles each installed with on-board sensors as mobile nodes and providing road side units as mobile edge computing nodes, and creating the mobile edge computing network configured for a wireless communication between each mobile node and each mobile edge computing node by using a mobile node set V comprising m mobile nodes and a mobile edge computing node set MECN comprising n mobile edge computing nodes, where $V=\{v_1, v_2, \ldots, v_j, \ldots, v_m\}$, $v_j$ represents a j-th mobile node and $m \geq 2$, and $MECN=\{MECN_1, MECN_2, \ldots, MECN_k, \ldots, MECN_n\}$, $MECN_k$ represents a k-th mobile edge computing node and $n \geq 50$;

(2) generating a key pair for each mobile node and each mobile edge computing node in the mobile edge computing network by:

calculating a first key pair for each mobile node and a second key pair for each mobile edge computing node in the mobile edge computing network by using the Elliptic Curve Cryptography, to obtain a first key pair set $Key_V$ of the mobile node set V and a second key pair set $Key_{MECN}$ of the mobile edge computing node set MECN, wherein $$Key_V = \{(K_1^{pu}, K_1^{pr}), (K_2^{pu}, K_2^{pr}), \ldots, (K_j^{pu}, K_j^{pr}), \ldots, (K_m^{pu}, K_m^{pr})\}$$

$$Key_{MECN} = \{(\overline{K}_1^{pu}, \overline{K}_1^{pr}), (\overline{K}_2^{pu}, \overline{K}_2^{pr}), \ldots, (\overline{K}_k^{pu}, \overline{K}_k^{pr}), \ldots, (\overline{K}_n^{pu}, \overline{K}_n^{pr})\}$$

where $K_j^{pu}$ and $K_j^{pr}$ represent first public and private keys of the j-th mobile node $v_j$ respectively, and $\overline{K}_k^{pu}$ and $\overline{K}_k^{pr}$ represent second public and private keys of the k-th computing node $MECN_k$ respectively;

(3) creating a local model set LM of the mobile node set V by:

inputting, by each mobile node, environmental perception information acquired by the on-board sensors of each mobile node, to a deep neural network DNN for iterative training, to obtain the local model set LM of the mobile node set V, wherein $$LM = \{lm_1, lm_2, \ldots, lm_j, \ldots, lm_m\}$$

where $lm_j$ represents a local model of the j-th mobile node $v_j$;

(4) enabling the j-th mobile node $v_j$ to communicate with the nearest k-th mobile edge computing node $MECN_k$ from the j-th mobile node $v_j$ by the sub-steps of:

(4a) selecting, by the j-th mobile node $v_j$, the nearest k-th mobile edge computing node $MECN_k$ from the j-th mobile node $v_j$, based on the environmental perception information acquired by the sensors of the j-th mobile node $v_j$, and sending a local model uploading request $L\_Req_{v_j}$ and the first private key $K_j^{pr}$ to the nearest k-th mobile edge computing node $MECN_k$, wherein $$L\_Req_{v_j}: \begin{Bmatrix} K_j^{pu} \\ lm_j \\ timestamp_j \end{Bmatrix}$$

where $timestamp_j$ represents when the local model uploading request $L\_Req_{v_j}$ is established by the j-th mobile node $v_j$;

(4b) viewing, by the nearest k-th mobile edge computing node $MECN_k$, the local model uploading request $L\_Req_{v_j}$, via the first private key $K_j^{pr}$, and then confirming, by the nearest k-th mobile edge computing node $MECN_k$, an identity of the j-th mobile node $v_j$ sending the local model uploading request $L\_Req_{v_j}$, via the first public key $K_j^{pu}$, and then sending from the nearest k-th mobile edge computing node $MECN_k$ to the j-th mobile node $v_j$ a response $L\_Res_{MECN_k}$ of allowing the local model $lm_j$ of the j-th mobile node $v_j$ to be uploaded and the second private key $\overline{K}_k^{pr}$, $$L\_Res_{MECN_k}: \begin{Bmatrix} L\_Req_{v_j} \\ \overline{K}_k^{pu} \\ timestamp_k \end{Bmatrix}$$

where $timestamp_k$ represents when the response $L\_Res_{MECN_k}$ is established by the nearest k-th mobile edge computing node $MECN_k$;

(4c) uploading from the j-th mobile node $v_j$ to the nearest k-th mobile edge computing node $MECN_k$ the local model $lm_j$ of the j-th mobile node $v_j$;

(5) creating P supernode sequences, by the mobile edge computing node set MECN, by the sub-steps of:

(5a) setting the number of iterations as p, where initially p=1, and setting the maximum number of iterations as P, where P≥1;

(5b) selecting, by the mobile edge computing node set MECN, 21 mobile edge computing nodes as supernodes depending on a BFT-DPoS consensus mechanism and randomly sorting the 21 mobile edge computing nodes to obtain a supernode sequence $$\overline{MECN}^p = \{\overline{MECN}_s^p, s=1, 2, \ldots, 21\},$$

where $\overline{MECN}_s^p$ represents a s-th supernode of the 21 supernodes selected at a p-th time;

(5c) judging whether p=P or not, if the judgment result is yes, creating the P supernode sequences, otherwise, setting p=p+1 and performing the sub-step (5b);

(6) creating a blockchain based on the P supernode sequences by the sub-steps of:

(6a) setting a t-th block in the blockchain to be created as $Block_t$, where $h(Block_t)$ is a Hash Value of the $Block_t$ and $timestamp_t$ is a timestamp of $Block_t$, and setting t=1, p=1, and s=1;

(6b) generating, by the $\overline{MECN}_s^p$, a Block comprising the LM, the $h(Block_t)$, and the $timestamp_t$, and setting the $Block_t$ as a genesis block of the blockchain to be created;

(6c) setting s=2 and t=2;

(6d) generating, by the $\overline{MECN}_s^p$, a $Block_t$ comprising the LM, the $h(Block_t)$, the $h(Block_{t-1})$ and the $timestamp_t$;

(6e) broadcasting, by the $\overline{MECN}_s^p$, the $Block_t$ to other supernodes, where $h(Block_t)$ is compared with a preset threshold ε by each of the other supernodes, if the $h(Block_t) < \varepsilon$, then the $Block_t$ is valid, otherwise the $Block_t$ is invalid;

(6f) judging, by the $\overline{MECN}_s^p$, whether the number of the valid $Block_t$ is more than ⅔(s−1), if the judgment result is yes, setting the $Block_t$ as a new additional block of the blockchain to be created, and performing step (6g) by setting t=t+1, otherwise, performing step (6g) by discarding the Block;

(6g) judging whether s=21 or not, if the judgment result is yes, obtaining a p-th sub-chain of the blockchain to be created and performing step (6h), otherwise, performing step (6d) by setting s=s+1;

(6h) judging whether p=P or not, if the judgment result is yes, creating the blockchain comprising P sub-chains, otherwise, performing step (6d) by setting p=p+1 and s=1;

(7) updating the local model set LM by the sub-steps of:

(7a) downloading, by the j-th mobile node $v_j$, the LM in an end block of the blockchain, and calculating a weight $\overline{W}$ and a bias $\overline{b}$ of LM from a weight $W_j$ and a bias $b_j$ of $lm_j$ by:

$$\overline{W} = \frac{W_1 + W_2 + \ldots + W_j + \ldots + W_m}{m}$$

$$\overline{b} = \frac{b_1 + b_2 + \ldots + b_j + \ldots + b_m}{m};$$

(7b) updating the local model set LM, by the j-th mobile node $v_j$, with the weight $\overline{W}$ and the bias $\overline{b}$ by using parameter updating formulas of the deep neural network DNN, to obtain an updated local model set LM.

Compared with the prior art, the present disclosure has advantages.

1. As the model training can be performed by each mobile node in the mobile edge network of the present disclosure, the updated model can always be downloaded via the blockchain by any mobile node (unless all of the mobile nodes in the mobile edge network fail), so as to ensure the decision for autonomous driving can be made effectively.

2. Every block except the genesis block in the blockchain to be created in the present disclosure is generated by using the Hash Value of a previous block. Thus, it is necessary to modify data in all of the previous blocks to the genesis block for modifying data in the present block. The extreme difficulty of modifying the data ensures that the model in the blockchain would not be falsified by the malicious nodes, so as to significantly increase the accuracy of the decision made for autonomous driving.

3. As the model uploading request is sent to the corresponding mobile edge computing node from each mobile node of the present disclosure before uploading the model, the identity of the mobile node is verified via the public key in the request and then the model can be uploaded from the mobile node, ensuring that the model is sent from a reliable mobile node of the mobile edge computing network and further improving the accuracy of the decision for autonomous driving.

4. As the model can be trained by each mobile node in the mobile edge computing network in the present disclosure, and then the model set is packaged into the blockchain by the supernode sequences comprising part of mobile edge computing nodes, and then the model set is downloaded from the blockchain to the mobile node and updated by the mobile node. As such, the model training can be distributed and performed in each mobile node. Compared with the prior art in which the data is gathered and the model is trained in the cloud-based service. The efficiency of the model training is improved, thus significantly increasing the efficiency of the decision for autonomous driving.

DETAILED DESCRIPTION OF PREFERRED EMBODIMENTS

The present disclosure will be further described in detail below in conjunction with the drawings and specific embodiments.

Figure 1:
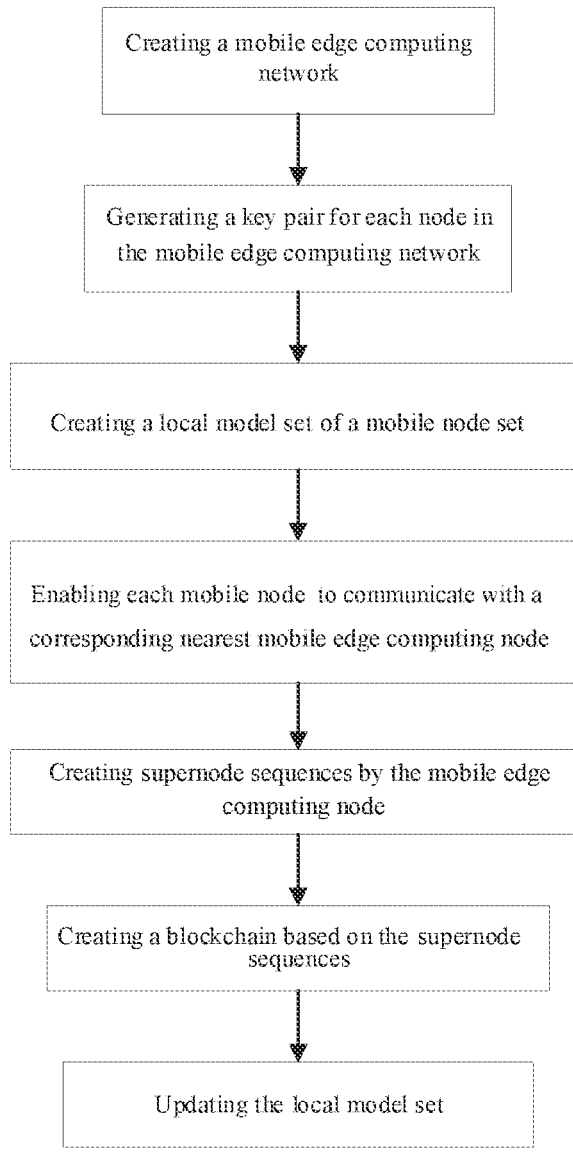
FIG. 1 is a flow chart of an embodiment of the present disclosure.

Referring to FIG. 1, the present disclosure comprises the following steps.

Step 1) creating a mobile edge computing network by:
providing autonomous vehicles each installed with on-board sensors as mobile nodes and providing road side units as mobile edge computing nodes, and creating the mobile edge computing network configured for a wireless communication between each mobile node and each mobile edge computing node by using a mobile node set V comprising m mobile nodes and a mobile edge computing node set MECN comprising n mobile edge computing nodes, where $V=\{v_1, v_2, \ldots, v_j, \ldots, v_m\}$, $v_j$ represents a j-th mobile node and m≥2, and $MECN=\{MECN_1, MECN_2, \ldots, MECN_k, \ldots, MECN_n\}$, $MECN_k$ represents a k-th mobile edge computing node and n≥50;

In an optional embodiment, m=4 and n=50, and for example an autonomous vehicle named TOYOTA RAV4 configured with an in-vehicle communication system and a comma.ai autopilot is selected as a mobile node. The autonomous vehicle has a driving speed in the range of 30~50 km/h and an acceleration in the range of −2~2 m/s².

Step 2) generating a key pair for each mobile node and each mobile edge computing node in the mobile edge computing network by the sub-steps of:

(2a) selecting a base point G on an elliptic curve by using the Elliptic Curve Cryptography, and generating a first 256-bit random number $K_j^{pr}$ for the j-th mobile node $v_j$ and a second 256-bit random number $\overline{K}_k^{pr}$ for the k-th mobile edge computing node $MECN_k$, where the $K_j^{pr}$ is used as a first private key for the j-th key and the $\overline{K}_k^{pr}$ is used as a second private key for the k-th mobile edge computing node $MECN_k$, (2b) calculating a first public key $K_j^{pu}$ of the j-th mobile node $v_j$ and a second public key $\overline{K}_k^{pu}$ of the k-th mobile edge computing node $MECN_k$, where the first public key $K_j^{pu}$ can be used to verify an identity of the j-th mobile node $v_j$, wherein $$K_j^{pu}=K_j^{pr} \cdot G$$

$$\overline{K}_j^{pu}=\overline{K}_j^{pr} \cdot G;$$

(2c) providing a first key pair $(K_j^{pu}, K_j^{pr})$ of the j-th mobile node $v_j$ and a second key pair $(\overline{K}_k^{pu}, \overline{K}_k^{pr})$ of the k-th mobile edge computing node $MECN_k$, so as to obtain a first key pair set $Key_V$ of the mobile node set V and a second key pair set $Key_{MECN}$ of the mobile edge computing node set MECN, wherein $$Key_V=\{(K_1^{pu},K_1^{pr}),(K_2^{pu},K_2^{pr}), \ldots, (K_j^{pu},K_j^{pr}), \ldots, (K_m^{pu},K_m^{pr})\}$$

$$Key_{MECN}=\{(\overline{K}_1^{pu},\overline{K}_1^{pr}),(\overline{K}_2^{pu},\overline{K}_2^{pr}), \ldots, (\overline{K}_k^{pu},\overline{K}_k^{pr}), \ldots, (\overline{K}_n^{pu},\overline{K}_n^{pr})\}.$$

Step 3) creating a local model set LM of the mobile node set V by:
inputting, by each mobile node, environmental perception information acquired by the on-board sensors of each mobile node, to a deep neural network DNN for iterative training, to obtain the local model set LM of the mobile node set V, wherein $$LM=\{lm_1, lm_2, \ldots, lm_j, \ldots, lm_m\}$$

where $lm_j$ represents a local model of the j-th mobile node $v_j$

In an optional embodiment, the DNN comprises 5 layers and each layer comprises 20 nodes.

Step 4) enabling the j-th mobile node $v_j$ to communicate with the nearest k-th mobile edge computing node $MECN_k$ from the j-th mobile node $v_j$ by the sub-steps of:

(4a) selecting, by the j-th mobile node $v_j$, the nearest k-th mobile edge computing node $MECN_k$ from the j-th mobile node $v_j$, based on the environmental perception information acquired by the sensors of the j-th mobile node $v_j$, and sending a local model uploading request L_Req$_{v_j}$ and the first private key K$_j^{pr}$ to the nearest k-th mobile edge computing node MECN$_k$, wherein $$L\_Req_{v_j}: \begin{Bmatrix} K_j^{pu} \\ lm_j \\ timestamp_j \end{Bmatrix}$$

where timestamp$_j$ represents when the local model uploading request L_Req$_{v_j}$ is established by the j-th mobile node v$_j$;

(4b) viewing, by the nearest k-th mobile edge computing node MECN$_k$, the local model uploading request L_Rec$_{v_j}$, via the first private key K$_j^{pr}$, and then confirming, by the nearest k-th mobile edge computing node MECN$_k$, an identity of the j-th mobile node v$_j$ sending the local model uploading request L_Req$_{v_j}$ via the first public key K$_j^{pu}$, and then sending from the nearest k-th mobile edge computing node MECN$_k$ to the j-th mobile node v$_j$ a response L_Res$_{MECN_k}$ of allowing the local model lm$_j$ of the j-th mobile node v$_j$ to be uploaded and the second private key $\overline{K}_k^{pr}$, $$L\_Res_{MECN_k}: \begin{Bmatrix} L\_Req_{v_j} \\ \overline{K}_k^{pu} \\ timestamp_k \end{Bmatrix}$$

where timestamp$_k$ represents when the response L_Res$_{MECN_k}$ is established by the nearest k-th mobile edge computing node MECN$_k$.

Figure 2:
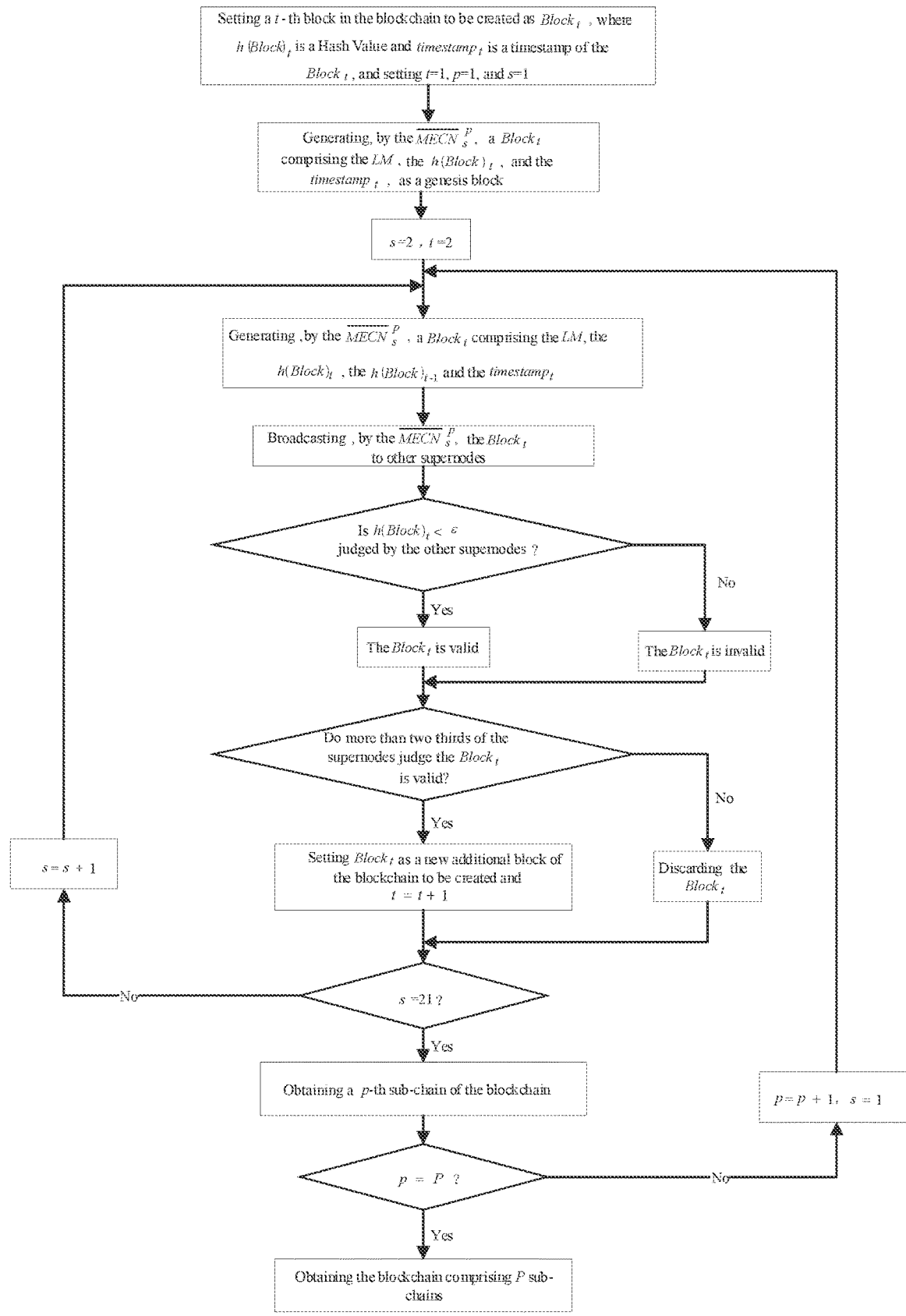
FIG. 2 is another flow chart of an embodiment of the present disclosure to create a blockchain based on P supernode sequences.

As the identity of the j-th mobile node v$_j$ sending the local model uploading request L_Rec$_{v_j}$ is verified via the public key K$_j^{pu}$ by the k-th mobile edge computing node MECN$_k$, it is ensured that the j-th mobile node v$_j$ from where the model is uploaded is a reliable node in the mobile edge computing network, so as to significantly increase the accuracy of the decision made for autonomous driving;

(4c) uploading from the j-th mobile node v$_j$ to the nearest k-th mobile edge computing node MECN$_k$ the local model lm$_j$ of the j-th mobile node v$_j$;

Step 5) creating P supernode sequences, by the mobile edge computing node set MECN, by the sub-steps of:

(5a) setting the number of iterations as p, where initially p=1, and setting the maximum number of iterations as P, where P≥1;

(5b) voting, by the mobile edge computing node set MECN, 21 mobile edge computing nodes as supernodes depending on a BFT-DPoS consensus mechanism in which all of the mobile edge computing nodes in the mobile edge computing node set MECN are considered as voting nodes and candidate nodes simultaneously, to obtain the 21 mobile edge computing nodes with the highest number of votes and set the 21 mobile edge computing nodes as the supernodes $$\overline{MECN}^p = \{\overline{MECN}_s^p, s=1, 2, \ldots, 21\},$$

where $\overline{MECN}_s^p$ represents a s-th supernode of the 21 supernodes selected at a p-th time;

(5c) judging whether p=P or not, if the judgment result is yes, creating the P supernode sequences, otherwise, setting p=p+1 and performing the sub-step (5b);

Step 6) creating a blockchain based on the P supernode sequences, as shown in FIG. 2, by the steps of:

(6a) setting a t-th block in the blockchain to be created as Block$_t$, where h(Block$_t$) is a Hash Value of the Block$_t$ and timestamp$_t$ is a timestamp of Block$_t$, and setting t=1, p=1, and s=1;

(6b) generating, by the $\overline{MECN}_s^p$, a Block$_t$ comprising the LM, the h(Block$_t$), and the timestamp$_t$, and setting the Block$_t$ as a genesis block of the blockchain to be created;

(6c) setting s=2 and t=2;

(6d) generating, by the $\overline{MECN}_s^p$, a Block$_t$ comprising the LM, the h(Block$_t$), the h(Block$_{t-1}$) and the timestamp$_t$;

(6e) broadcasting, by the $\overline{MECN}_s^p$, the Block to other supernodes, where h(Block$_t$) is compared with a preset threshold ε by each of the other supernodes, if the h(Block$_t$)<ε, then the Block$_t$ is valid, otherwise the Block$_t$ is invalid;

(6f) judging, by the $\overline{MECN}_s^p$, whether the number of the valid Block is more than ⅔(s−1), if the judgment result is yes, setting the Block$_t$ as a new additional block of the blockchain to be created, and performing step (6g) by setting t=t+1, otherwise, performing step (6g) by discarding the Block$_t$;

(6g) judging whether s=21 or not, if the judgment result is yes, obtaining a p-th sub-chain of the blockchain to be created and performing step (6h), otherwise, performing step (6d) by setting s=s+1; and (6h) judging whether p=P or not, if the judgment result is yes, creating the blockchain comprising P sub-chains, otherwise, performing step (6d) by setting p=p+1 and s=1.

Every block except the genesis block in the blockchain to be created is generated by using the Hash Value of a previous block. Thus, it is necessary to modify data in all of the previous blocks to the genesis block for modifying data in the present block. The extreme difficulty of modifying the data ensures that the model in the blockchain would not be falsified by the malicious nodes, so as to significantly increase the accuracy of the decision made for autonomous driving.

(7) updating the local model set LAI by the sub-steps of:

(7a) downloading, by the j-th mobile node v$_j$, the LM in an end block of the blockchain, and calculating a weight $\overline{W}$ and a bias $\overline{b}$ of the LM from a weight W$_j$ and a bias b$_j$ of the lm$_j$ by:

$$\overline{W} = \frac{W_1 + W_2 + \ldots + W_j + \ldots + W_m}{m}$$

$$\overline{b} = \frac{b_1 + b_2 + \ldots + b_j + \ldots + b_m}{m};$$

(7b) updating the local model set LM, by the j-th mobile node v$_j$, by putting the weight $\overline{W}$ and the bias $\overline{b}$ into parameter updating formulas of the deep neural network DNN, to obtain an updated local model set. The parameter updating formulas are as below:

$$\overline{W}^l = \overline{W}^l - \eta \frac{\partial f}{\partial \overline{b}^l}(a^{l-1})^T$$

$$\overline{b}^l = \overline{b}^l - \eta \frac{\partial f}{\partial \overline{b}^l}$$

where $\overline{W}^l$ represents a weight of a l-th layer of the DNN, $\overline{b}^l$ represents a bias of the l-th layer of the DNN, $(a^{l-1})^T$ represents a transposition of an output vector of the l-1-th layer of the DNN, $$\frac{\partial f}{\partial \overline{b}^l}$$

represents a loss function related to $\overline{b}^l$ of the DNN, and η represents a learning rate.

Each mobile node may further include a first processor, a first memory and a first transceiver. The first processor may be configured to implement the proposed functions, procedures and/or methods as described in this description. Layers of the radio interface protocol may be implemented in the first processor. The first memory is operatively coupled with the first processor and stores a variety of information to operate the first processor. The first transceiver is operatively coupled with the first processor, and transmits and/or receives a radio signal.

Similarly, each mobile edge computing node may include a second processor, a second memory and a second transceiver. The second processor may be configured to implement the proposed functions, procedures and/or methods as described in this description. Layers of the radio interface protocol may be implemented in the second processor. The second memory is operatively coupled with the second processor and stores a variety of information to operate the second processor. The second transceiver is operatively coupled with the second processor, and transmits and/or receives a radio signal.

The first and second processors may include application-specific integrated circuit (ASIC), other chipset, logic circuit and/or data processing device. The first and second memories may include read-only memory (ROM), random access memory (RAM), flash memory, memory card, storage medium and/or other storage device. The first and second transceivers may include baseband circuitry to process radio frequency signals. When the embodiments described above are implemented in software, the techniques described herein can be implemented with modules (e.g., procedures, functions, and so on) that perform the functions described herein. The modules can be stored in memories and executed by processors. The first and second memories can be implemented within the first and second processors or external to the first and second processors in which case the memories can be communicatively coupled to the first and second processors via various means as is known in the art.

The flowcharts in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. It is well-known to a person skilled in the art that the implementations of using hardware, using software or using the combination of software and hardware can be equivalent with each other.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. The scope of the present invention is defined by the attached claims.

The invention claimed is:

1. A method for sharing models among autonomous vehicles based on a blockchain, comprising the steps of:
   (1) creating a mobile edge computing network by:
      providing autonomous vehicles each installed with on-board sensors as mobile nodes and providing road side units as mobile edge computing nodes, and creating the mobile edge computing network configured for a wireless communication between each mobile node and each mobile edge computing node by using a mobile node set V comprising m mobile nodes and a mobile edge computing node set MECN comprising n mobile edge computing nodes,
      where $V=\{v_1, v_2, \ldots, v_j, \ldots, v_m\}$, $v_j$ represents a j-th mobile node and m≥2, and
      $MECN=\{MECN_1, MECN_2, \ldots, MECN_k, \ldots, MECN_n\}$, $MECN_k$ represents a k-th mobile edge computing node and n≥50;
   (2) generating a key pair for each mobile node and each mobile edge computing node in the mobile edge computing network by:
      calculating a first key pair for each mobile node and a second key pair for each mobile edge computing node in the mobile edge computing network by using the Elliptic Curve Cryptography, to obtain a first key pair set $Key_V$ of the mobile node set V and a second key pair set $Key_{MECN}$ of the mobile edge computing node set MECN, wherein $Key_V = \{(K_1^{pu}, K_1^{pr}), (K_2^{pu}, K_2^{pr}), \ldots, (K_j^{pu}, K_j^{pr}), \ldots, (K_m^{pu}, K_m^{pr})\}$ $Key_{MECN} = \{(\overline{K}_1^{pu}, \overline{K}_1^{pr}), (\overline{K}_2^{pu}, \overline{K}_2^{pr}), \ldots, (\overline{K}_k^{pu}, \overline{K}_k^{pr}), \ldots, (\overline{K}_n^{pu}, \overline{K}_n^{pr})\}$ where $K_j^{pu}$ and $K_j^{pr}$ represent first public and private keys of the j-th mobile node $v_j$ respectively, and $\overline{K}_k^{pu}$ and $\overline{K}_k^{pr}$ represent second public and private keys of the k-th computing node $MECN_k$ respectively;
   (3) creating a local model set LM of the mobile node set V by:
      inputting, by each mobile node, environmental perception information acquired by the on-board sensors of each mobile node, to a deep neural network DNN for iterative training, to obtain the local model set LM of the mobile node set V, wherein $LM = \{lm_1, lm_2, \ldots, lm_j, \ldots, lm_m\}$ where $lm_j$ represents a local model of the j-th mobile node $v_j$;

(4) enabling the j-th mobile node $v_j$ to communicate with the nearest k-th mobile edge computing node $MECN_k$ from the j-th mobile node $v_j$ by the sub-steps of:

(4a) selecting, by the j-th mobile node $v_j$, the nearest k-th mobile edge computing node $MECN_k$ from the j-th mobile node $v_j$, based on the environmental perception information acquired by the sensors of the j-th mobile node $v_j$, and sending a local model uploading request $L\_Req_{v_j}$ and the first private key $K_k^{pr}$ to the nearest k-th mobile edge computing node $MECN_k$, wherein $$L\_Req_{v_j}: \begin{Bmatrix} K_j^{pu} \\ lm_j \\ timestamp_j \end{Bmatrix}$$

where $timestamp_j$ represents when the local model uploading request $L\_Req_{v_j}$ is established by the j-th mobile node $v_j$;

(4b) viewing, by the nearest k-th mobile edge computing node $MECN_k$, the local model uploading request $L\_Rec_{v_j}$, via the first private key $K_j^{pr}$, and then confirming, by the nearest k-th mobile edge computing node $MECN_k$, an identity of the j-th mobile node $v_j$ sending the local model uploading request $L\_Req_{v_j}$, via the first public key $K_k^{pu}$, and then sending from the nearest k-th mobile edge computing node $MECN_k$ to the j-th mobile node $v_j$ a response $L\_Res_{MECN_k}$ of allowing the local model $lm_j$ of the j-th mobile node $v_j$ to be uploaded and the second private key $\overline{K}_k^{pr}$, $$L\_Res_{MECN_k}: \begin{Bmatrix} L\_Req_{v_j} \\ \overline{K}_k^{pu} \\ timestamp_k \end{Bmatrix}$$

where $timestamp_k$ represents when the response $L\_Res_{MECN_k}$ is established by the nearest k-th mobile edge computing node $MECN_k$;

(4c) uploading from the j-th mobile node $v_j$ to the nearest k-th mobile edge computing node $MECN_k$ the local model $lm_j$ of the j-th mobile node $v_j$;

(5) creating P supernode sequences, by the mobile edge computing node set MECN, by the sub-steps of:

(5a) setting the number of iterations as p, where initially p=1, and setting the maximum number of iterations as P, where P≥1;

(5b) selecting, by the mobile edge computing node set MECN, 21 mobile edge computing nodes as supernodes depending on a BFT-DPoS consensus mechanism and randomly sorting the 21 mobile edge computing nodes to obtain a supernode sequence $$\overline{MECN}^p = \{\overline{MECN}_s^p, s=1, 2, \ldots, 21\},$$

where $\overline{MECN}_s^p$ represents a s-th supernode of the 21 supernodes selected at a p-th time;

(5c) judging whether p=P or not, if the judgment result is yes, creating the P supernode sequences, otherwise, setting p=p+1 and performing the sub-step (5b);

(6) creating a blockchain based on the P supernode sequences by the sub-steps of:

(6a) setting a t-th block in the blockchain to be created as $Block_t$, where $h(Block_t)$ is a Hash Value of the $Block_t$ and $timestamp_t$ is a timestamp of $Block_t$, and setting t=1, p=1, and s=1;

(6b) generating, by the $\overline{MECN}_s^p$, a $Block_t$ comprising the LM, the $h(Block_t)$, and the $timestamp_t$, and setting the $Block_t$ as a genesis block of the blockchain to be created;

(6c) setting s=2 and t=2;

(6d) generating, by the $\overline{MECN}_s^p$, a $Block_t$ comprising the LM, the $h(Block_t)$, the $h(Block_{t-1})$ and the $timestamp_t$;

(6e) broadcasting, by the $\overline{MECN}_s^p$, the $Block_t$ to other supernodes, where $h(Block_t)$ is compared with a preset threshold ε by each of the other supernodes, if the $h(Block_t)<ε$, then the $Block_t$ is valid, otherwise the $Block_t$ is invalid;

(6f) judging, by the $\overrightarrow{MECN}_s^p$, whether the number of the valid $Block_t$ is more than ⅔(s−1), if the judgment result is yes, setting the $Block_t$ as a new additional block of the blockchain to be created, and performing step (6g) by setting t=t+1, otherwise, performing step (6g) by discarding the $Block_t$;

(6g) judging whether s=21 or not, if the judgment result is yes, obtaining a p-th sub-chain of the blockchain to be created and performing step (6h), otherwise, performing step (6d) by setting s=s+1;

(6h) judging whether p=P or not, if the judgment result is yes, creating the blockchain comprising P sub-chains, otherwise, performing step (6d) by setting p=p+1 and s=1;

(7) updating the local model set LM by the sub-steps of:

(7a) downloading, by the j-th mobile node $v_j$, the LM in an end block of the blockchain, and calculating a weight $\overline{W}$ and a bias $\overline{b}$ of LM from a weight $W_j$ and a bias $b_j$ of $lm_j$ by:

$$\overline{W} = \frac{W_1 + W_2 + \ldots + W_j + \ldots + W_m}{m}$$

$$\overline{b} = \frac{b_1 + b_2 + \ldots + b_j + \ldots + b_m}{m};$$

(7b) updating the local model set LM, by the j-th mobile node $v_j$, with the weight $\overline{W}$ and the bias $\overline{b}$, by using parameter updating formulas of the deep neural network DNN to obtain an updated local model set.

2. The method according to claim 1, wherein in step (2), calculating the first key pair for each mobile node and the second key pair for each mobile edge computing node in the mobile edge computing network by using the Elliptic Curve Cryptography further comprises the sub-steps of:

(2a) selecting a base point G on an elliptic curve by using the Elliptic Curve Cryptography, and generating a first 256-bit random number $K_j^{pr}$ for the j-th mobile node $v_j$ and a second 256-bit random number $\overline{K}_k^{pr}$ for the k-th mobile edge computing node $MECN_k$, where the $K_j^{pr}$ is used as a first private key for the j-th key and the $\overline{K}_k^{pr}$ is used as a second private key for the k-th mobile edge computing node $MECN_k$, (2b) calculating a first public key $K_j^{pu}$ of the j-th mobile node $v_j$ and a second public key $\overline{K}_k^{pu}$ of the k-th mobile edge computing node $MECN_k$, wherein $$K_j^{pu}=K_j^{pr} \cdot G$$

$$\overline{K}_k^{pu}=\overline{K}_k^{pr} \cdot G.$$

3. The method according to claim 1, wherein in step (5b), selecting, by the mobile edge computing node set MECN, 21 mobile edge computing nodes as supernodes depending on a BFT-DPoS consensus mechanism comprises the step of: voting, by the mobile edge computing node set MECN, the 21 mobile edge computing nodes as the supernodes depending on the BFT-DPoS consensus mechanism in which all of the mobile edge computing nodes in the mobile edge computing node set MECN are considered as voting nodes and candidate nodes simultaneously, to obtain the 21 mobile edge computing nodes with the highest number of votes and set the 21 mobile edge computing nodes as the supernodes.

4. The method according to claim 1, wherein in step (7b), the parameter updating formulas are as below $$\overline{W}^l = \overline{W}^l - \eta \frac{\partial f}{\partial \overline{b}^l}(a^{l-1})^T$$

$$\overline{b}^l = \overline{b}^l - \eta \frac{\partial f}{\partial \overline{b}^l}$$

where $\overline{W}^l$ represents a weight of a l-th layer of the DNN, $\overline{b}^l$ represents a bias of the l-th layer of the DNN, $(a^{l-1})^T$ represents a transposition of an output vector of the l-1-th layer of the DNN, $$\frac{\partial f}{\partial \overline{b}^l}$$

represents a loss function related to $\overline{b}^l$ of the DNN, and $\eta$ represents a learning rate.

\* \* \* \* \*